United States Patent
Adan et al.

(10) Patent No.: US 6,172,354 B1
(45) Date of Patent: Jan. 9, 2001

(54) OPERATOR INPUT DEVICE

(75) Inventors: Manolito E. Adan, Woodinville, WA (US); Tetsuji Aoyagi, Kanagawa-ken (JP); Todd E. Holmdahl, Bothell; Terry M. Lipscomb, Bellevue, both of WA (US); Takeshi Miura, Aomori-ken (JP)

(73) Assignee: Microsoft Corporation, Redmond, WA (US)

( * ) Notice: Under 35 U.S.C. 154(b), the term of this patent shall be extended for 0 days.

(21) Appl. No.: 09/036,809

(22) Filed: Mar. 9, 1998

Related U.S. Application Data

(60) Provisional application No. 60/073,303, filed on Jan. 28, 1998.

(51) Int. Cl.$^7$ .................................................. G09G 1/00
(52) U.S. Cl. ........................................... 250/221; 345/156
(58) Field of Search ................................. 250/221, 222.1, 250/208.1; 345/156–164

(56) References Cited

U.S. PATENT DOCUMENTS

| | | | |
|---|---|---|---|
| D. 281,776 | 12/1985 | Griffin | D13/32 |
| D. 302,010 | 7/1989 | McLaughlin et al. | D14/100 |
| D. 315,896 | 4/1991 | Brown | D14/100 |
| 4,364,035 | 12/1982 | Kirsch | 340/710 |
| 4,390,873 | 6/1983 | Kirsch | 340/710 |
| 4,578,674 | 3/1986 | Baker et al. | 340/710 |
| 4,647,771 | 3/1987 | Kato | 250/237 R |
| 4,682,159 | 7/1987 | Davison | 340/709 |
| 4,712,101 | 12/1987 | Culver | 340/710 |
| 4,736,191 | 4/1988 | Matzke et al. | 340/365 |
| 4,751,505 | 6/1988 | Williams et al. | 340/710 |
| 4,799,055 | 1/1989 | Nestler et al. | 340/710 |
| 4,804,949 | 2/1989 | Faulkerson | 340/710 |
| 4,856,785 | 8/1989 | Lantz et al. | 273/148 B |
| 4,857,903 | 8/1989 | Zalenski | 340/710 |
| 4,906,843 | 3/1990 | Jones et al. | 250/221 |
| 4,922,236 | 5/1990 | Heady | 340/710 |
| 4,949,080 | 8/1990 | Mikan | 340/711 |
| 5,045,843 | 9/1991 | Hansen | 340/709 |
| 5,142,506 | 8/1992 | Edwards | 367/127 |
| 5,274,361 | 12/1993 | Snow | 345/166 |
| 5,296,838 | 3/1994 | Suzuki | 345/157 |
| 5,298,919 | 3/1994 | Chang | 345/163 |
| 5,347,275 | 9/1994 | Lau | 341/20 |

(List continued on next page.)

FOREIGN PATENT DOCUMENTS

| | | |
|---|---|---|
| 0 572 009 A1 | 12/1993 | (EP) . |
| 2 272 763 | 5/1994 | (GB) . |
| WO 97/06506 | 2/1997 | (WO) . |

OTHER PUBLICATIONS

"Lyon's eye", brochure, 1998.
"Genius Optical Mouse", brochure, 1988.
"Three–Button Mouse", brochure, Media Depot Inc., copyright 1995–96.
"Opt–Mouse", brochure, Copyright 1998, Silicon Graphics, Inc.
"Your Gateway to the Next Millennium", Tronix Corp., 3 page copy of web page dated Apr. 8, 1998.
"Q–500 Optical Mouse", 4 page copy of web site dated Apr. 9, 1998.

\* cited by examiner

*Primary Examiner*—Stephone B. Allen
(74) *Attorney, Agent, or Firm*—Westman, Champlin & Kelly, P.A.

(57) ABSTRACT

An operator input device is configured to provide position information based on relative movement of the surface and the operator input device. The operator input device includes an image detector which is configured to detect an image on the surface and provide an image signal corresponding to the image detected. A controller is coupled to the image detector and is configured to receive the image signal and provide the position information based on a position of the image relative to the image detector.

37 Claims, 13 Drawing Sheets

U.S. PATENT DOCUMENTS

| | | | |
|---|---|---|---|
| 5,349,371 | 9/1994 | Fong | 345/166 |
| 5,367,315 | 11/1994 | Pan | 345/156 |
| 5,440,144 | 8/1995 | Raffel et al. | 250/574 |
| 5,463,387 | 10/1995 | Kato | 341/31 |
| 5,471,542 | 11/1995 | Ragland | 382/128 |
| 5,517,211 | 5/1996 | Kwang-Chien | 345/166 |
| 5,525,764 | 6/1996 | Jukins et al. | 178/18 |
| 5,532,476 | 7/1996 | Mikan | 250/221 |
| 5,557,440 | 9/1996 | Hanson et al. | 359/161 |
| 5,558,329 | 9/1996 | Liu | 273/148 B |
| 5,561,445 | 10/1996 | Miwa et al. | 345/163 |
| 5,563,631 | 10/1996 | Masunaga | 345/169 |
| 5,574,480 | 11/1996 | Pranger et al. | 345/166 |
| 5,577,848 | 11/1996 | Bowen | 400/472 |
| 5,578,817 | 11/1996 | Bidiville et al. | 250/221 |
| 5,617,312 | 4/1997 | Iura et al. | 364/188 |
| 5,627,565 | 5/1997 | Morishita et al. | 345/158 |
| 5,644,337 | 7/1997 | Stacy | 345/167 |
| 5,680,157 | 10/1997 | Bidiville et al. | 345/165 |
| 5,686,942 | 11/1997 | Ball | 345/158 |
| 5,694,153 | 12/1997 | Aoyagi et al. | 345/161 |
| 5,729,009 * | 3/1998 | Dändliker et al. | 250/221 |

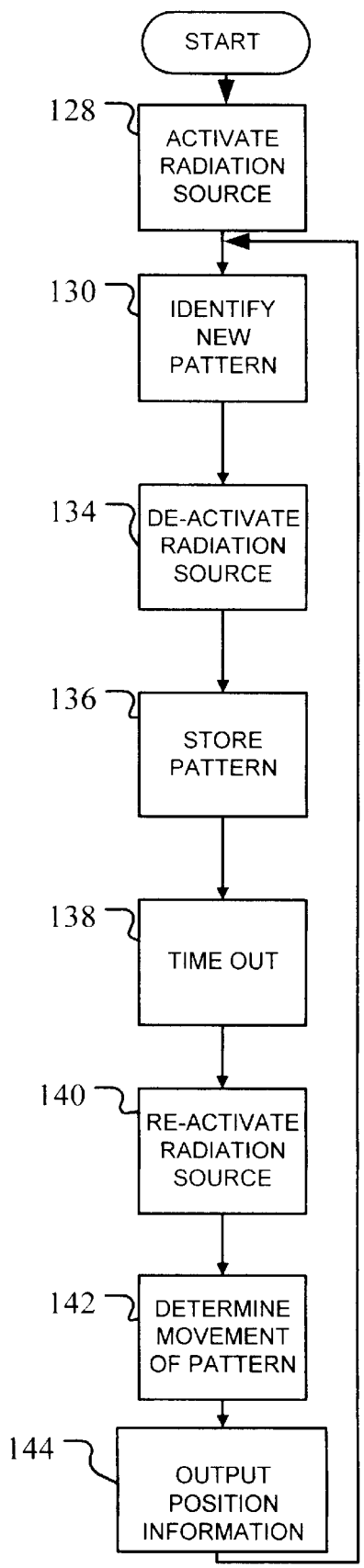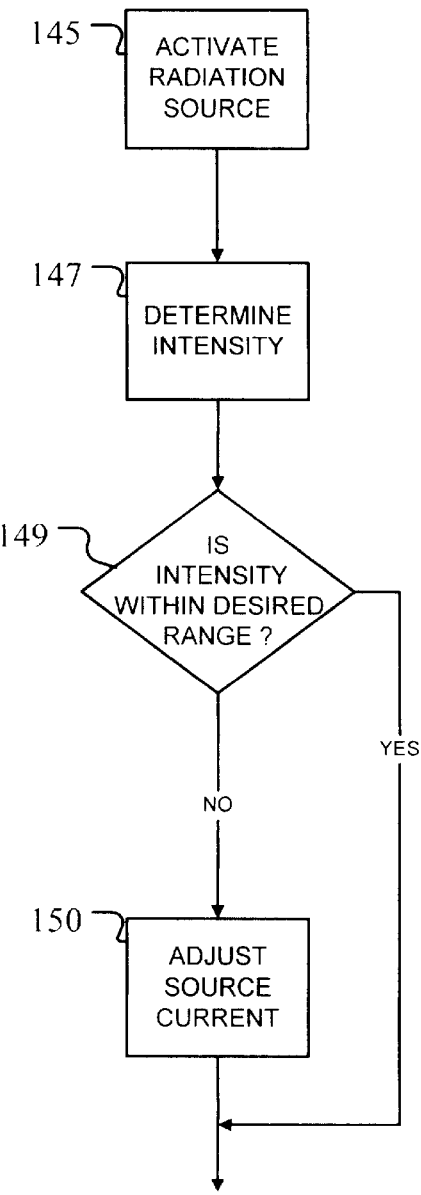
FIG. 4B
FIG. 4A

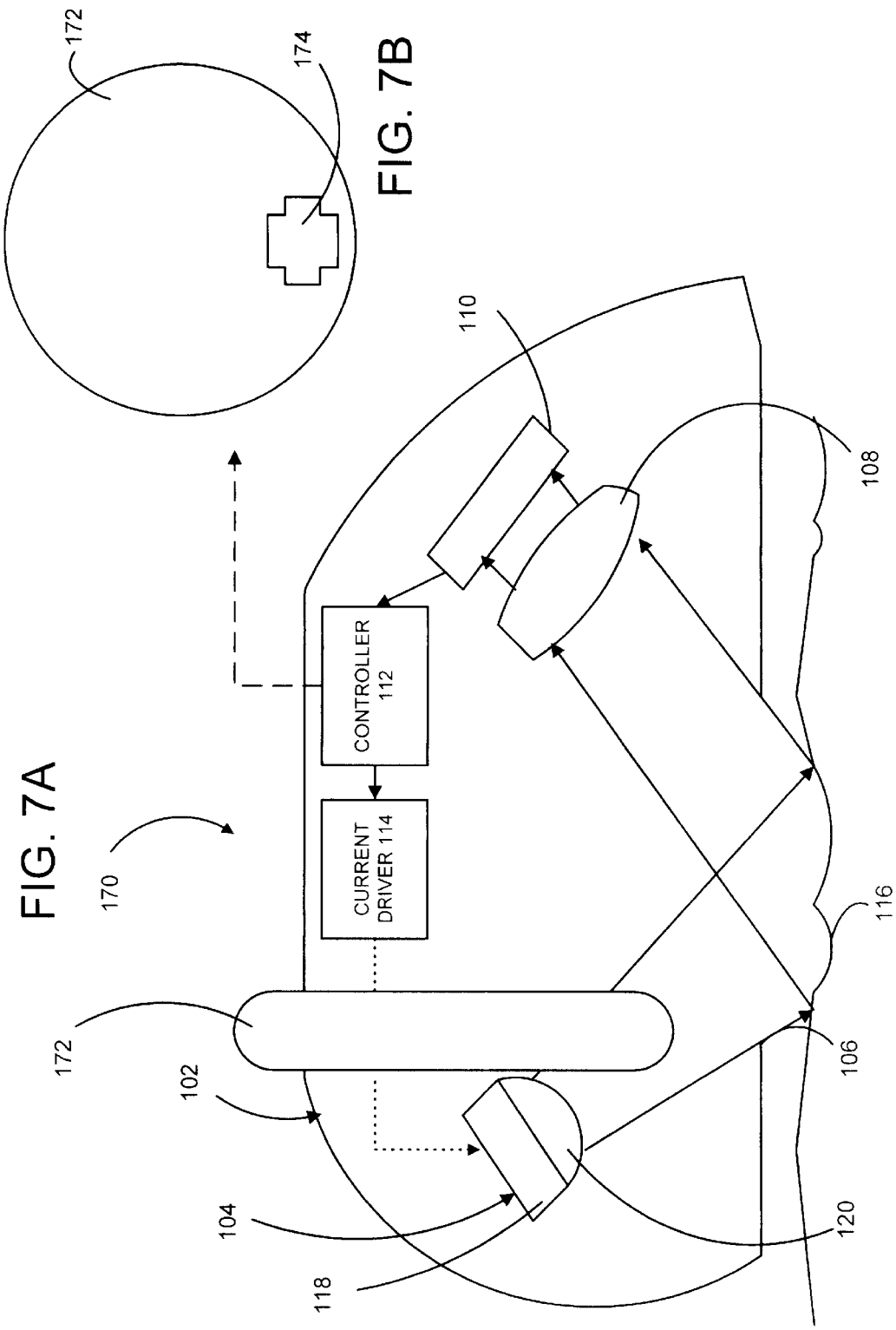

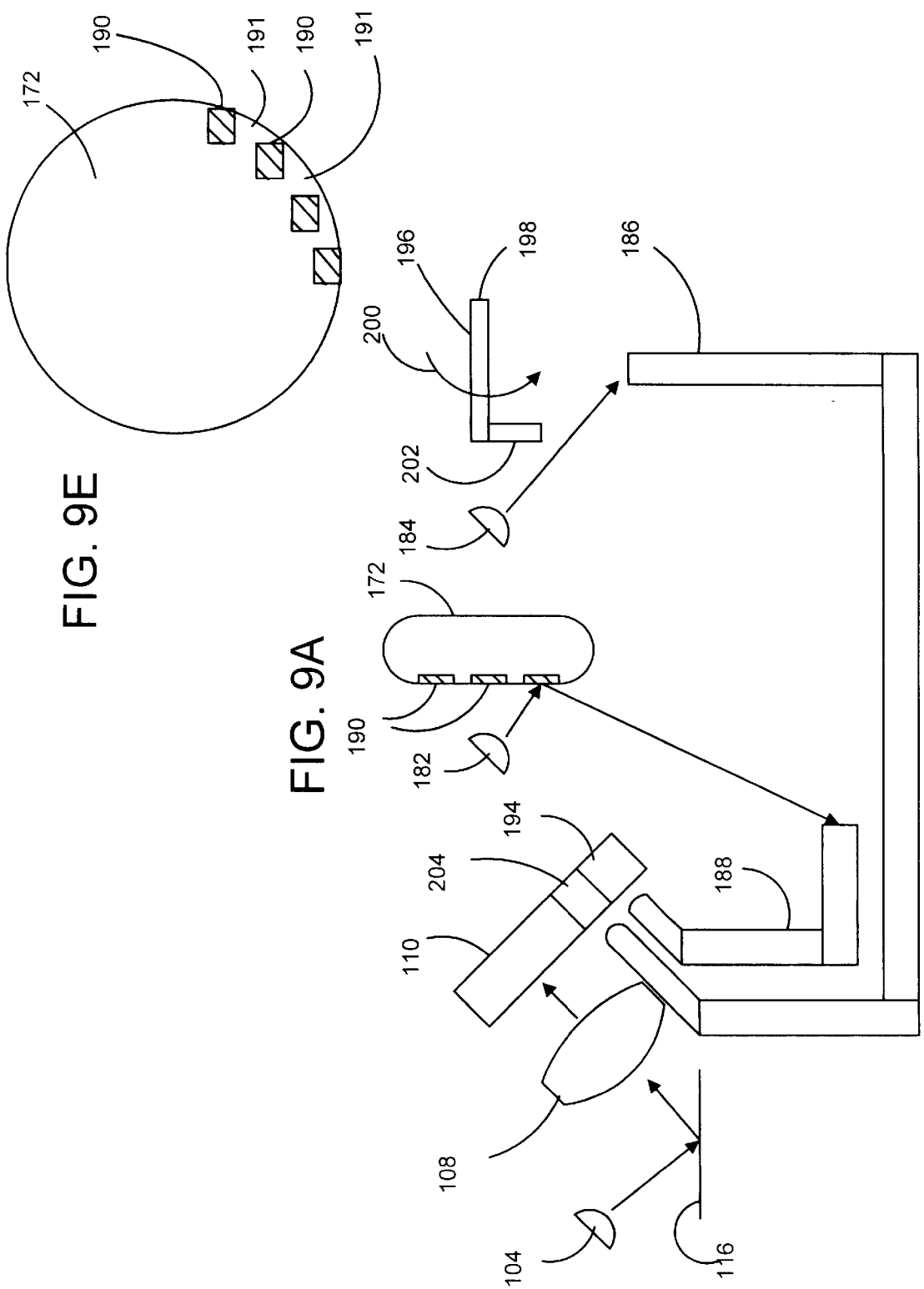

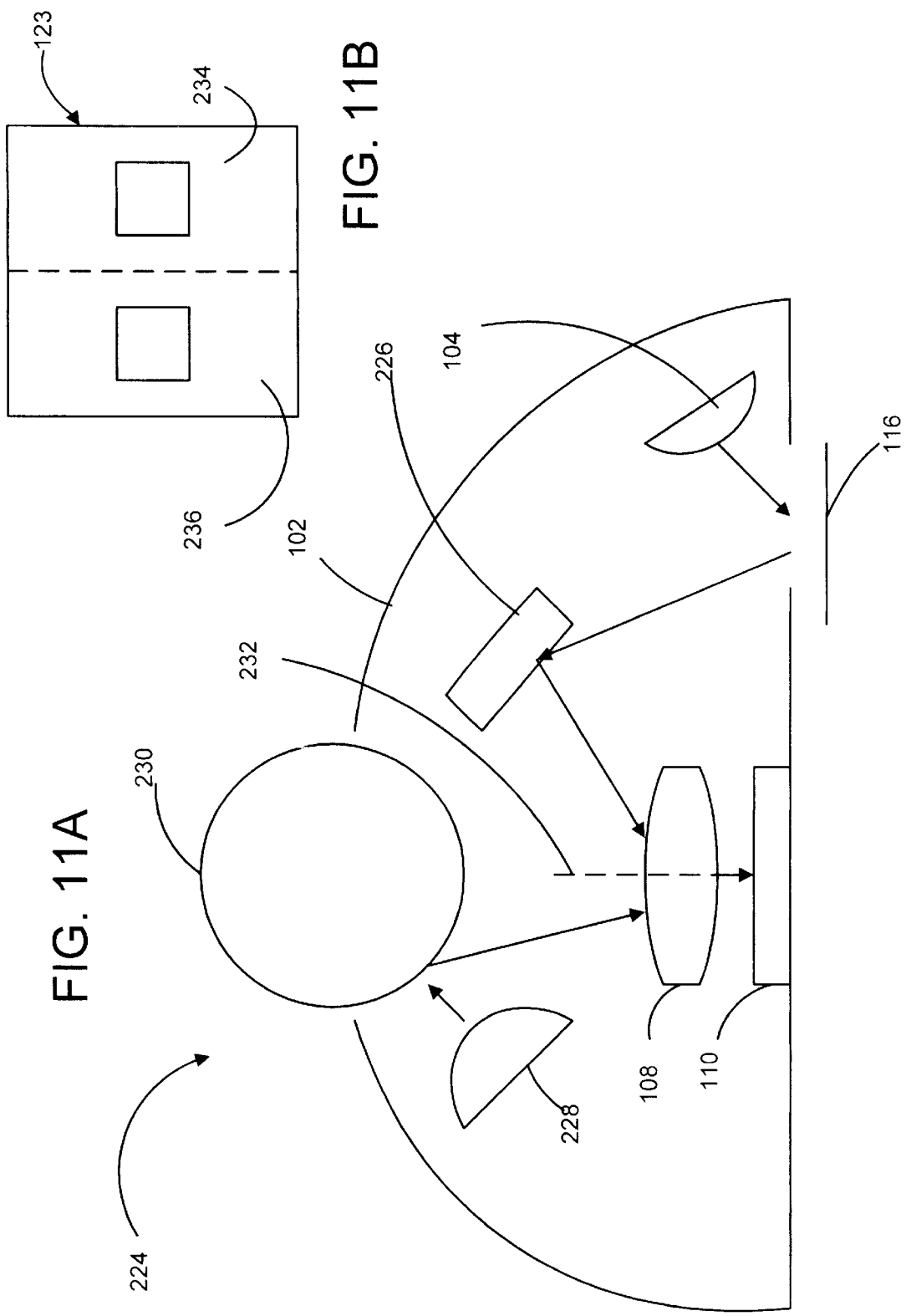

OPERATOR INPUT DEVICE

INCORPORATION BY REFERENCE

The following U.S. Patent is hereby fully incorporated by reference:

U.S. Pat. No. 5,581,094, to Hara et al., entitled PHOTO-DETECTOR ARRAY COMPRISING PHOTODETECTORS, AN OBJECT DETECTOR COMPRISING THE PHOTODETECTOR ARRAY and an OBJECT DETECTING PROCEDURE, and assigned to Mitsubishi Electric Corporation.

The present application is based on a provisional application serial. No. 60/073,303 filed on Jan. 28, 1998.

BACKGROUND OF THE INVENTION

The present invention relates to an input device for a computer system. More specifically, the present invention relates to an input device for providing position information to the computer system based on movement of the input device.

A traditional computer input device, such as a mouse, includes a housing, with a ball mounted in the housing. The ball is either configured in a traditional manner in which, in the normal work position, the ball engages a work surface and rotates based on the user's movement of the mouse across the work surface. The ball may also be provided as a track ball, which is rotated by digital manipulation from the user. In either case, position encoders are used to detect rotation of the ball in the mouse, and to provide position information indicative of that rotation to the computer. In many instances, the position information is used to control movement of a visual image (such as a mouse cursor) on the display screen of the computer.

Also, in one prior device, a mouse is configured with the track ball arrangement described above. The track ball is preprinted with a predetermined image. A charge coupled device is used to detect the image on the track ball and detect movement of the image. Movement of the predefined image is used to provide position information to the computer.

However, the prior computer mouse which uses the charge coupled device configuration has a number of significant disadvantages. First, the reaction time of charge coupled devices is quite slow. In addition, processing an image signal from a charge coupled device is computationally intensive and takes a relatively large, and expensive processor. Also, charge coupled devices are highly sensitive to saturation. In other words, if the ambient light conditions are variable, charge coupled devices do not perform well. In addition, if an extraneous light source, such as a flashlight, is directed toward the image producing surface, the charge coupled devices can easily become saturated and their performance then quickly degrades.

Further, another prior computer mouse commercially available from Mouse Systems of CA included a mouse with an LED which was used in conjunction with a mouse pad having a predetermined pattern thereon. The pattern was formed by a grid of blue and red lines. The emissions from the LED was reflected off of the mouse pad to a detector which provided an analog output signal. The signal was in the form of a waveshape with peaks corresponding to the different colored grid lines. From this waveform, the lines were counted and interpolated to obtain position information. Such a mouse system requires a special mouse pad with a special pattern implemented thereon.

SUMMARY OF THE INVENTION

An operator input device is configured to provide position information based on relative movement of the operator input device and surface. The operator input device includes a pattern detector which is configured to detect a pattern on the surface and provide a pattern image signal corresponding to the pattern detected. The surface has no predefined pattern thereon. A controller is coupled to the pattern detector and is configured to receive the image signal and provide the position information based on a position of the pattern relative to the pattern detector.

In one preferred embodiment, the controller is coupled to the pattern detector and is configured to receive a primary image signal at an initial time and receive a secondary image a variable time later. The controller computes and provides the position information based on a determination of the motion changes observed from the primary image to the secondary image.

BRIEF DESCRIPTION OF THE DRAWINGS

FIGS. 4A and 4B are flow diagrams illustrating the operation of a computer input device in accordance with certain aspects of the present invention.

FIGS. 7A and 7B illustrate an operator input device in accordance with another aspect of the present invention.

FIG. 9A is a block diagram of a portion of a user input device in accordance with another aspect of the present invention.

FIGS. 9B–9E illustrate detection of patterns using the user input device shown in FIG. 9A.

FIG. 11A is a block diagram of a portion of a user input device in accordance with another aspect of the present invention.

FIG. 11B illustrates detection of patterns using the device shown in FIG. 11A.

DETAILED DESCRIPTION OF THE PREFERRED EMBODIMENTS

The present invention provides a user input device for generating position information and providing that information to a computer system. The position information is generated based on detected movement of the user input device, or a portion thereof. The movement is detected by identifying a pattern or image on a surface movable relative to the user input device and monitoring relative movement of the pattern.

OVERVIEW

Figure 1:
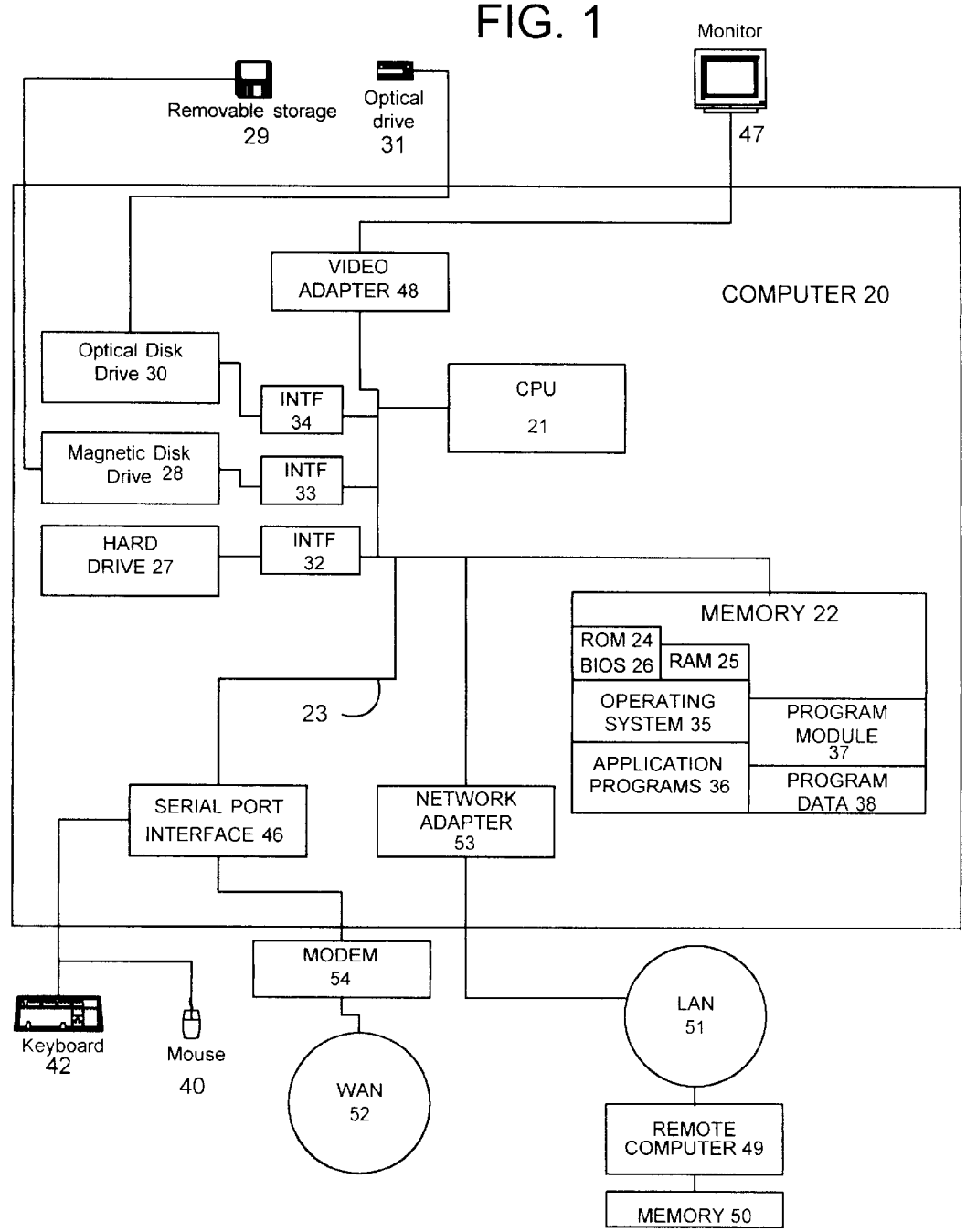
FIG. 1 is a block diagram of an exemplary environment for implementing an input device in accordance with the present invention.

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer or other computing device. Generally, program modules include routine programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention is also applicable in distributed computing environments where tasks are performed by remote processing devices that are linked through a communications network. In a distributed computing environment, program modules may be located in both local and remote memory storage devices.

With reference to FIG. 1, an exemplary environment for the invention includes a general purpose computing device in the form of a conventional personal computer 20, including processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 a random access memory (RAM) 25. A basic input/output 26 (BIOS), containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 42 and pointing device 40. Other input devices (not shown) may include a microphone, joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or/a universal serial bus (USB). A monitor 47 or other type of display device is also connected to the system bus 23 via an interface, such as a video adapter 48. In addition to the monitor 47, personal computers may typically include other peripheral output devices such as speaker 45 and printers (not shown).

The personal computer 20 may operate in a networked environment using logic connections to one or more remote computers, such as a remote computer 49. The remote computer 49 may be another personal computer, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local are network (LAN) 51 and a wide area network (WAN) 52. Such networking environments are commonplace in offices, enterprise-wide computer network intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used.

Figure 2:
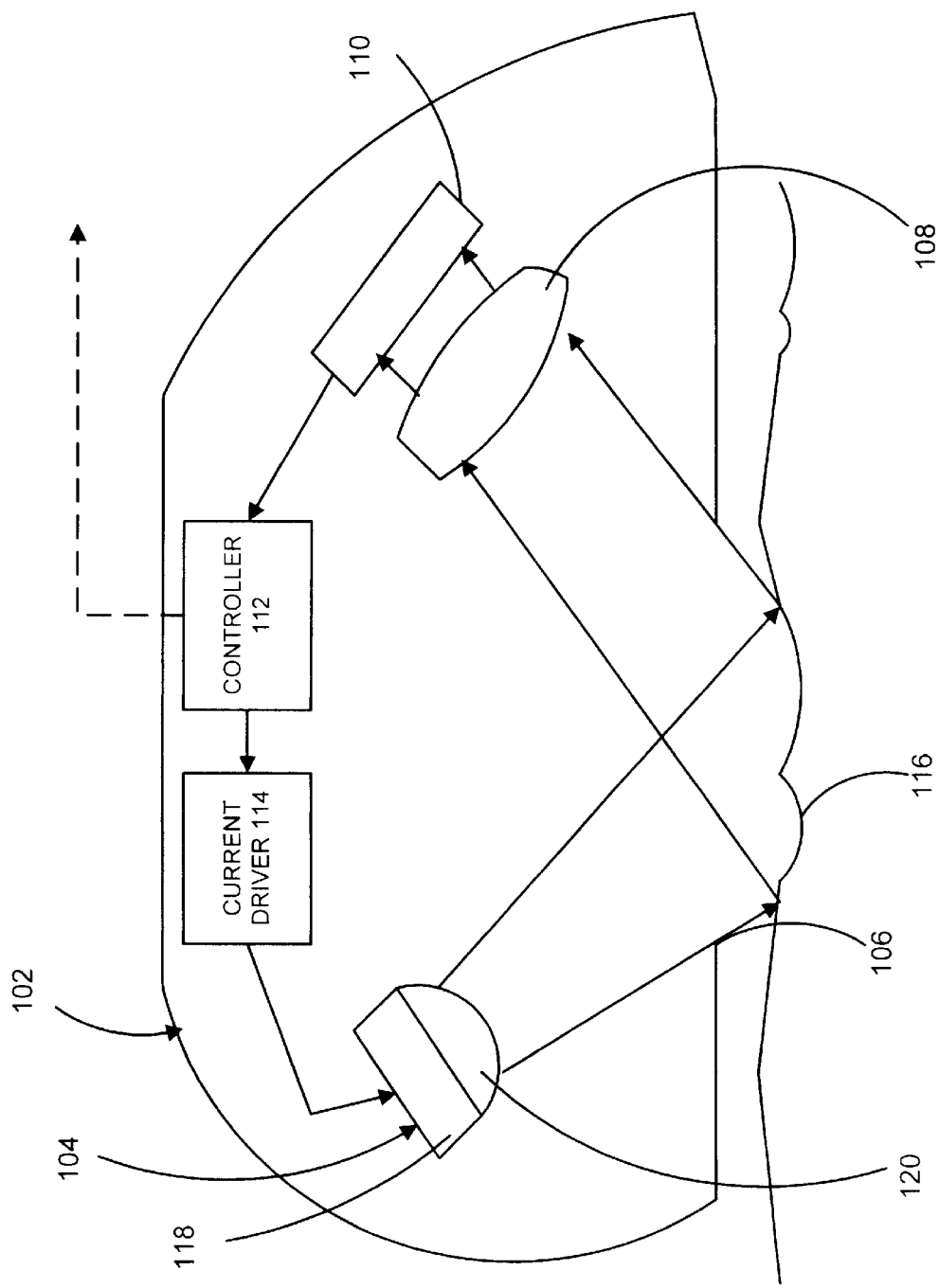
FIG. 2 illustrates a computer input device, shown in partial sectional and partial block diagram form, in accordance with one aspect of the present invention.

FIG. 2 illustrates an operator input device, such as mouse 40. Mouse 40 includes housing 102, electromagnetic radiation source (which may simply be a light source such as an LED) 104, aperture 106 defined in the bottom of housing 102, lens 108, image or pattern detector 110, controller 112, and current driver 114. In FIG. 2, mouse 40 is shown supported relative to work surface 116. Pattern detector 110 can be any suitable detector and may be an artificial retina pattern detector.

Light source 104 can be any suitable source of electromagnetic radiation. In one illustrative embodiment, light source 104 includes LED 118 and lens 120. Radiation emitted from an LED 118 is transmitted through lens 120 such that it passes through aperture 106 in housing 102 and impinges upon work surface 116 which has no predetermined pattern or image thereon. The light then reflects off of work surface 116 toward lens 108. Lens 108 collects the radiation reflected from surface 116 and directs it to image detector (e.g., artificial retina) 110. It should be noted that lens 108 can be eliminated with the addition of lenses on either LED 118, image detector 110, or both.

Image detector 110 generates an image signal indicative of an image or pattern on work surface 116. The image signal is provided to controller 112 which computes position information based on the image signal. The position information indicates movement of mouse 40 relative to work surface 116, as will be described in more detail below. Position information is provided by controller 112, through an output such as a cable (not shown), to computer 20 illustrated in FIG. 1. Mouse 40 may also provide the output to controller 112 through a wireless transmission link such as infrared ultrasonic, or radiofrequency links.

In the preferred embodiment, the position information provided by controller 112 is provided according to a conventional format, such as through a serial interface, a universal serial bus (USB) interface, or in any other suitable interface format.

Image detector 110, in one illustrative embodiment, is an artificial retina manufactured by Mitsubishi Electric Corporation and includes a two-dimensional array of variable sensitivity photo detectors (VSPDs) which operates in a known manner. Briefly, the VSPDs are formed by a side-by-side pair of diodes integrated onto and separated by a semi-insulated GaAs layer (pn-np structure). In one embodiment, the array is a 32×32 element array, but could be larger or smaller as desired. The photo detector current depends, both in sign and magnitude, on applied voltage. Such VSPDs exhibit an analog memory affect which stores conductivity information when a voltage is applied in the presence of an optical write pulse. This information is retrieved by injecting an optical readout pulse.

Image processing in such devices is based on optical matrix-vector multiplication. An input image is projected onto the device as a weight matrix. All VSPDs have one electrode connected along rows, yielding a sensitivity control vector. Thus, the VSPD sensitivity can be set to arbitrary values in each row within a certain range. In addition, the remaining VSPD electrode is connected along columns, yielding an output current vector defined by the matrix vector product of the weight matrix times the sensitivity control vector.

In an illustrative embodiment, image detector 110 is controlled to perform edge extraction operations. The sensitivities of two adjacent detector rows are set to +1 and −1, respectively, whereas all other sensitivities are set at 0. In this embodiment, the output current is proportional to the difference in light intensities of the two active rows. By shifting the control voltage pattern in a cyclical manner (0, +1, −1, 0, 0, etc.), the horizontal edges of the input image are sensed. Thus, the system operates in a time sequential and semi-parallel mode.

In one illustrative embodiment, mouse 40 also includes current driver 114 which is coupled to source 104. In that embodiment, controller 112 intermittently senses the intensity of the radiation generated by source 104 and adjusts the current provided to source 104 through current driver 114. In other words, if the sensed intensity is lower than a desired range, controller 112 provides a feedback signal to current driver 114 to boost the current provided to source 104 in order to increase the intensity of the electromagnetic radiation emanating from source 104. If, on the other hand, the intensity of the radiation is higher than a desired range, controller 112 provides the feedback signal to current driver 114 to reduce the current provided to source 104 to thereby reduce the intensity of the radiation emitted from source 104. This may be done, for example, to reduce the overall power consumption of mouse 40. These steps of activating the radiation source (step 145), determining intensity (step 147), determining whether the intensity is within a desired range (step 149), and adjusting the current source (step 150) are illustrated in the flow diagram of FIG. 4B.

Figure 3A:
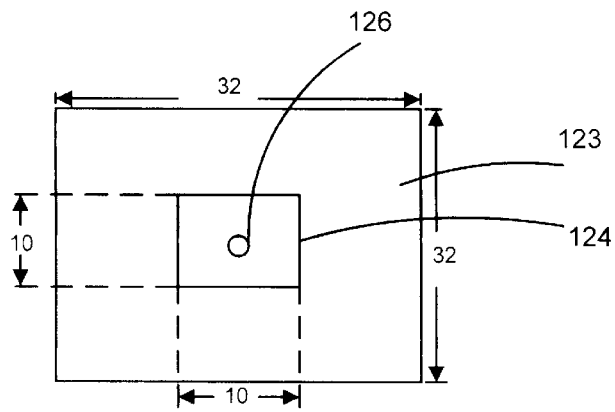
FIGS. 3A–3F illustrate the movement of images or patterns detected by the computer input device illustrated in FIG. 2.

FIGS. 3A–3E and 4A illustrate the operation of mouse 40 in accordance with one aspect of the present invention. FIG. 3A illustrates the 32×32 VSPD (pixel) array on image detector 110, onto which the image from surface 116 is directed. The entire viewing area 123 of image detector 110 is coincident with the 32×32 pixel array. However, defined within the entire viewing area 123, is sample area 124. Sample area 124 is smaller than the viewing area and includes, in one illustrative embodiment, a 10 pixel by 10 pixel area centered generally around a center 126 of viewing area 123.

In operation, controller 112 first activates source 104 such that radiation is impinged on work surface 116. This is indicated by block 128 in FIG. 4A. Substantially every surface has some irregularities or surface roughness, if only at the microscopic level. A commercially available artificial retina is capable of resolving images which are only a few microns in size, assuming the light source is powerful enough. Thus, the radiation is reflected off of surface 116 back to impinge on viewing area 123, carrying with it information indicative of an image or pattern formed by the surface roughness on surface 116.

Figure 3B:
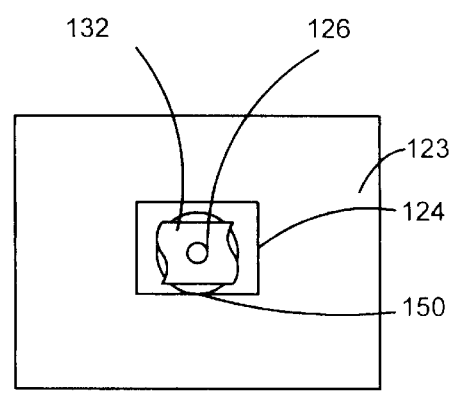

Next, a pattern on work surface 116 is identified, and source 104 is optionally deactivated. This is indicated in blocks 130 and 134. FIG. 3B illustrates the identification of an image or pattern 132 within sample area 124 of viewing area 123. As discussed above, identification of the image can be accomplished using edge extraction or any other suitable technique. Once image 132 has been identified, data corresponding to that image is stored in memory associated with controller 112. This is indicated by block 136 in FIG. 4A.

Next, controller 112 simply waits for a predetermined time out period. The duration of the time out period determines the sampling rate of the system and thus will depend upon the maximum expected velocity of the mouse. In one illustrative embodiment, the time out duration is approximately 1–10 milliseconds. The time out period is indicated by block 138 in FIG. 4A.

Figure 3C:
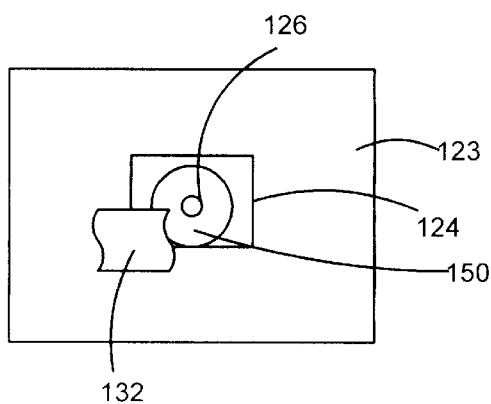
Figure 3D:
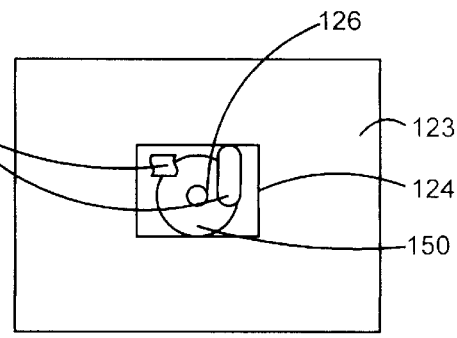

After the time out period, controller 112 reactivates source 104 (if it has been deactivated), as indicated by block 140, and determines whether image 132 has moved. This is indicated by block 142. Of course, movement of image 132 within viewing area 123 is illustrative of relative movement between mouse 40 (or at least the image detector 110 of mouse 40) and surface 116 from which the image 132 is detected. FIG. 3C illustrates movement of image 132 from a first position, shown in FIG. 3B, to a second position, offset from the first position, and illustrated in FIG. 3C.

Based on the movement detected, controller 112 provides position information in a customary and acceptable format, at an output (such as through a cable). Such position information can be used by a computing device, such as that described with respect to FIG. 1, for any number of things, including the movement of a mouse cursor on the monitor 42. Providing the position information is indicated by block 144 in FIG. 4A.

Figure 3E:
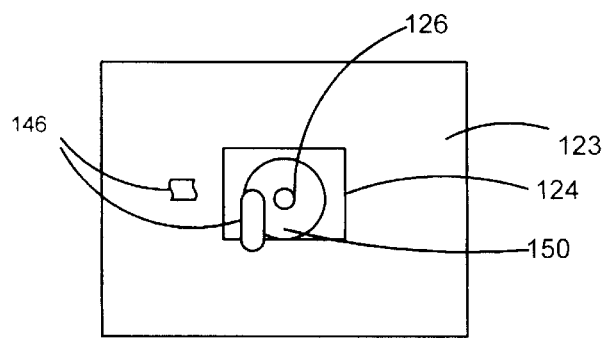

After movement of image or pattern 132 is detected, a new image or pattern such as image 146, is detected within sample area 124 of viewing area 123. This is indicted by block 130. Light source 104 may be deactivate and image data, indicative of the new image 146, is then stored. This is indicated by blocks 134 and 136. Controller 112 then again waits for the next time out period and determines whether image 146 has moved, such as is illustrated in FIG. 3E. This process continues such that mouse 40 continues to provide position information indicative of the relative movement of mouse 40 and work surface 116.

MOVEMENT DETECTION

Detection of movement of the images in viewing area 123 can be accomplished in a number of fashions. For example, cross correlation can be used to determine movement of the image within the viewing area 123. Cross correlation between the pattern in the sample area 124 and the pattern for the entire viewing or search area 123 is defined as follows:

$$R(x, y) = K \sum_{-\frac{L_p}{2}}^{+\frac{L_p}{2}} \sum_{-\frac{L_p}{2}}^{+\frac{L_p}{2}} P(i, j) Q(i-x, j-y) di dj \qquad \text{Equation 1}$$

where:
- $L_p$ is the length of the sample area 124;
- (i,j) is position data on the 32×32 pixel array;
- P(i,j) is the function which indicates light intensity and which corresponds to the pattern or image detected;
- Q(i,j) is a function indicative of light intensity over the entire viewing area 123; and
- R(x,y) is the correlation of P and Q.

This Equation can be written in the following summation form since the pattern is on the artificial retina cell array and has a quantum value over the entire length of the sample area $L_p$:

$$R(x, y) = K \sum_{i=-\frac{L_p}{2}}^{\frac{L_p}{2}} \sum_{j=-\frac{L_p}{2}}^{\frac{L_p}{2}} \{P(i, j) Q(i-x, j-y)\} \qquad \text{Equation 2}$$

From Equation 2, it can be determined that in order to obtain movement of the image, one must obtain P(i,j) first, and then after the time out period, obtain Q(i,j). Thereafter, the values of x and y are moved throughout the entire viewing area (or pixel region) 123 associated with the image detector, and Equation 2 is evaluated at each point. The maximum of R(x,y) will indicate the point at which the cross correlation is maximum, and will thus indicate the distance which the image has moved. In one illustrative embodiment where image detector 110 is implemented as the artificial retina chip from Mitsubishi Electric Corporation, the summation equations set out in Equation 2 can be obtained by simply summing up the current of one row in the photodetector array at a time. This is equal to one summation of Equation 2.

It should also be noted that, rather than identifying a specific shape, pattern or image in sample area 124, the entire sample area 124 can be used as the image. Then, cross correlation is simply determined between that entire image and a portion of the array on which that image resides after the time out period.

One potential disadvantage associated with the use of linear coordinates is that they provide position information which varies with rotation of mouse 42. Therefore, in another illustrative embodiment, circular harmonics are used to determine movement of the image. In that embodiment, circular coordinates r and θ are used instead of linear x,y coordinates. The circular coordinates are used to provide position information which is rotationally independent. Data representative of a sample image can be written as P(r,θ). This can be expanded by circular harmonics to:

$$P(r, \theta) = \sum_{m=-\infty}^{+\infty} K_m(r) e^{im\theta} \qquad \text{Equation 3}$$

where,
i=the imaginary unit scalers square root of −1 and each parameter of the terms in the summation are calculated as follows:

$$K_m(r) = \frac{1}{2\pi} \int_0^{2\pi} P(r, \theta) e^{-im\infty} d\theta \qquad \text{Equation 4}$$

First, a circle of radius r is identified in the sample area and a Fourier expansion is carried out along the perimeter of the circle. Coefficients of the calculated harmonics are stored. These steps are repeated for that circle in the viewing area after the time out. The coefficients are then compared to obtain a value indicative of the direction and magnitude of movement of the image.

It should be noted that Equation 3 is shown as a sum from −∞ to +∞. However, the sum need only actually be taken from zero to the size of the viewing area. Further, equation 3 is, in one illustrative embodiment, treated as a Euler function in order to make the calculation simpler, as follows:

$$e^{i\theta} = \cos\theta + i\sin\theta \qquad \text{Equation 5}$$

In another illustrative embodiment, pattern moment characteristics are used to determine movement of the image or pattern within the sample area. The pattern in the sample area can be represented by P(x,y) wherein the sample area is a square having sides of length $L_p$. The pattern moment $m_{pq}$ can be expressed as follows:

$$m_{pq} = \int_{-\frac{L_p}{2}}^{+\frac{L_p}{2}} \int_{-\frac{L_p}{2}}^{+\frac{L_p}{2}} P(x, y) x^p y^q dx dy \qquad \text{Equation 6}$$

where p and q are continuous integers that can take any significant value. In general, the $0^{th}$ order moment, where p, q equals 0 is given as follows:

$$m_\infty \int\int P(x,y) dx dy \qquad \text{Equation 7}$$

The $0^{th}$ order moment is understood to be the total mass of the pattern data. The first order moment $m_{10}, m_{01}$, is given as follows:

$$m_{10} = \int\int P(x,y) x dx dy$$
$$m_{01} = \int\int P(x,y) y dx dy \qquad \text{Equation 8}$$

When the first order moment is divided by the $0^{th}$ order moment, the coordinates of the center of mass are obtained as follows:

$$\frac{m_{10}}{m_{00}} = x_c$$
$$\frac{m_{01}}{m_{00}} = y_c \qquad \text{Equation 9}$$

The same process is then carried out using the second order moment, $m_{20}, m_{02}$ to obtain the principle axis.

Figure 3F:
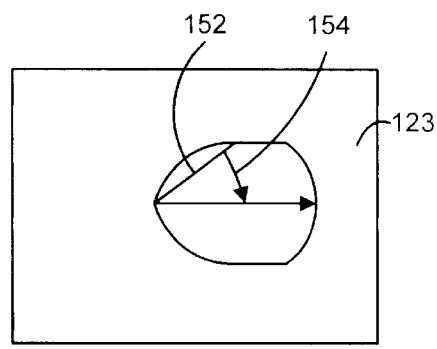

In yet another illustrative embodiment, a cord histogram method is used to determine movement. The shape of a pattern can be expressed by a cord histogram such as that shown in FIG. 3F. Only a single cord 152, and one angle 154 are shown in FIG. 3F. However, each cord can be written by its length and angle h(r,θ). Assuming each point of pixel data $D_{pix}$ on the shape perimeter is a 1, and the others are 0, then the requirement of the cord is to satisfy the following equation.

$$D_{pix}(x,y)D_{pix}(x+r\cos\theta, y+r\sin\theta)=1 \quad \text{Equation 10}$$

The total number of cords is given as follows, since $D_{pix}$ is defined to take either a 1 or a 0 value:

$$h(r,\theta)=\int\int D_{pix}(x,y)D_{pix}(x+r\cos\theta, y+r\sin\theta)dxdy \quad \text{Equation 11}$$

To make the computation simpler, assume h is a function of r only. Then one must simply count the number of pixels on the shape perimeter. Mathematically speaking, one simply sets one point on the shape as the origin, and then draws circles of radius r around the origin. The number of crossing points, of the circles crossing the perimeter, are counted. The radius is increased until there are no crossing points. The crossing points recorded become indicative of the shape of the perimeter.

DETECTING ROTATIONAL MOVEMENT

FIGS. 5 and 6A–6D illustrate another preferred embodiment in accordance with the present invention. Since conventional computer mice are often moved rotationally as well as linearly by the user, it may be desirable, in some instances, to have the detection algorithm for detecting movement of images or patterns be rotationally invariant such that they do not detect rotational movement of the mouse. However, in other embodiments, it may be desirable to have the algorithm detect rotational movement of the mouse. In those latter instances, it may be desirable to modify source 104.

Figure 6A:
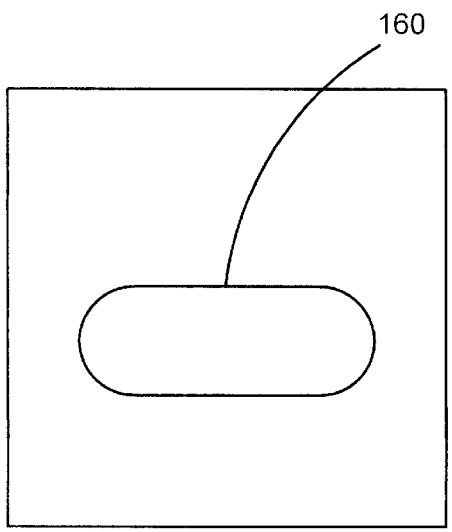
FIGS. 6A–6D illustrate imaging areas for detecting rotation of the operator input device.
Figure 6B:
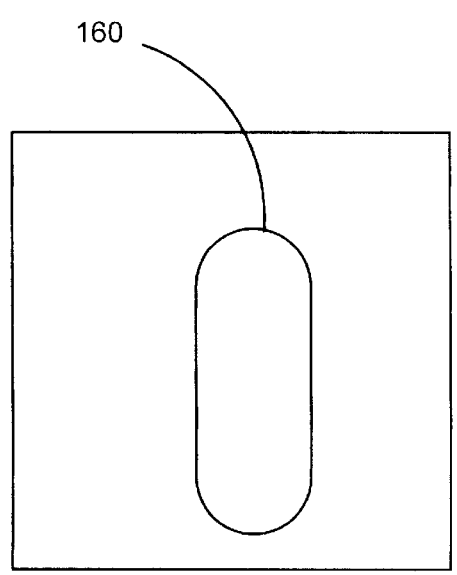
Figure 6C:
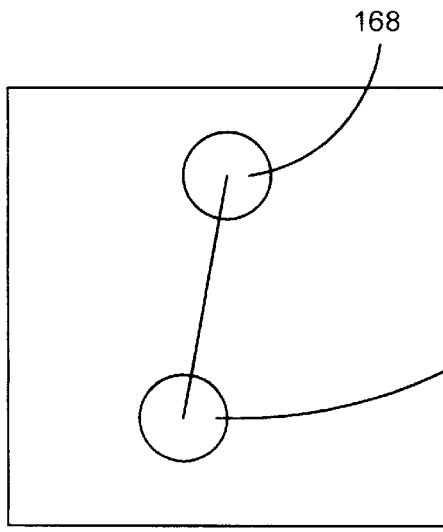
Figure 6D:
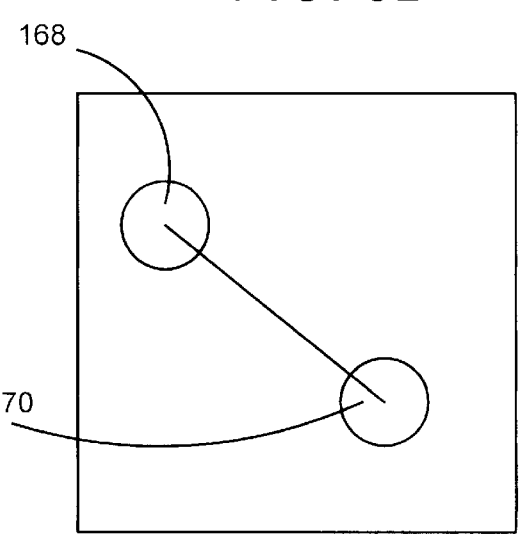

In one illustrative embodiment, where detection of rotational motion is desired, lens 120 (shown in FIG. 2) is shaped to transmit radiation in an elongate, or elliptical, pattern 160, as shown in FIG. 6A. Then, if the mouse is rotated, pattern 160 moves as shown in FIG. 6B. By making the pattern elongate e.g., elliptical) rather than simply round, this type of rotational motion can be more easily detected.

Figure 5:
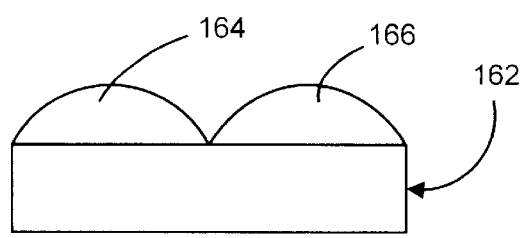
FIG. 5 illustrates a multiple source electromagnetic radiation emitter in accordance with one aspect of the present invention.

In addition, FIG. 5 illustrates another embodiment of a light source 162 which can be used in accordance with the present invention. Light source 162 actually includes two point light sources 164 and 166 (which may be LEDs and associated lenses) which are used to transmit radiation to the surface being viewed. In that instance, the image pattern detected by image detector 110 can be used to detect the most intense points within the image. Those most intense points 168 and 170 will correspond to light emitted by a region at or near the center of sources 164 and 166. Thus, rotation of the mouse will cause rotation of points 168 and 170 as illustrated in FIG. 6B. Again, this allows rotational motion of mouse 40 to be detected more easily.

FIG. 7A illustrates mouse 170 in accordance with another illustrative embodiment of the present invention. Mouse 170 has components which are similar to those shown in FIG. 2, and which are similarly numbered. However, mouse 170 also includes wheel 172. In the illustrative embodiment, wheel 172 is provided on housing 102, such that the operator can rotate wheel 172 to cause additional position information to be provided from mouse 170. In the embodiment shown in FIG. 7A, wheel 172 is interposed in the path of electromagnetic radiation emitted by source 104. However, wheel 172 also preferably has transparent portions thereof, such as notches or slits therein, to allow some of the radiation to impinge on surface 116. One embodiment of slits 174 is illustrated in FIG. 6B, which is a side view of wheel 172. Slits 174 are shown greatly enlarged for the sake of clarity and can take any suitable dimension. Slits 174 are illustratively provided in a predetermined pattern which is easily recognizable by image detector 110 and controller 112. However, slits 174 provide a rather large transparent area such that radiation can be emitted through the transparent area, onto surface 116, and then be reflected to image detector 110. In that way, image detector 110 and controller 112 can obtain signals indicative of images from surface 116, and can also detect and monitor rotational movement of wheel 172.

Figure 8A:
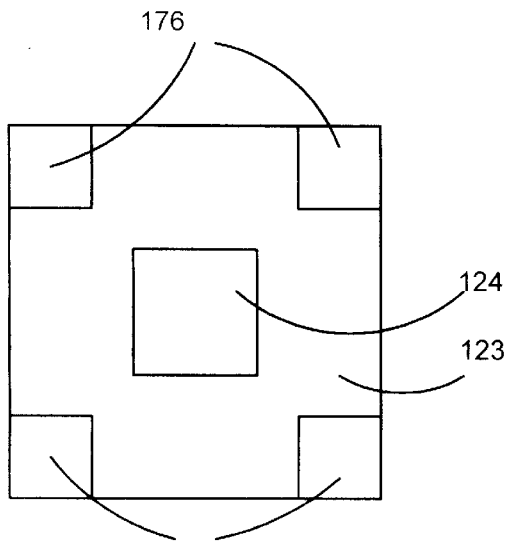
FIGS. 8A–8D illustrate detection of images or patterns using the operator input device illustrated in FIGS. 7A and 7B.
Figure 8C:
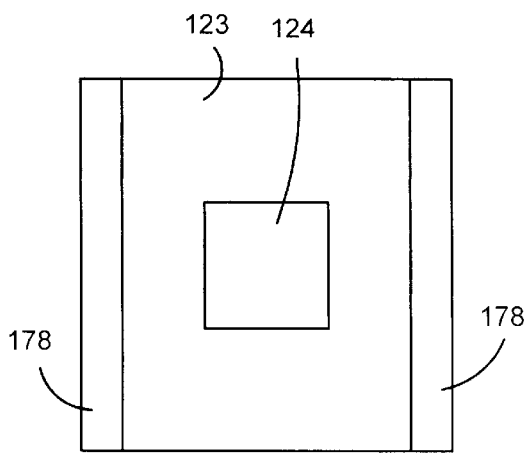
Figure 8B:
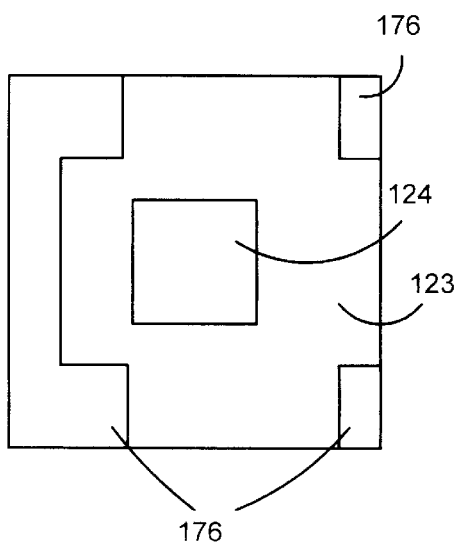

For example, FIG. 8A illustrates a pattern on viewing area 123 caused by slits 174. As in FIGS. 3A–3E, viewing area 123 includes sample area 124 within which patterns are identified, and from which movement of the patterns is determined. However, viewing area 123 also includes a predetermined pattern 176 superimposed thereon because the radiation travels only through the transparent portions of notches 174. As wheel 172 is rotated, the superimposed pattern 176 migrates across viewing area 123. For example, if wheel 172 is slightly rotated, then the pattern 176 superimposed on viewing area 123 migrates such as shown in FIG. 8B.

Figure 8D:
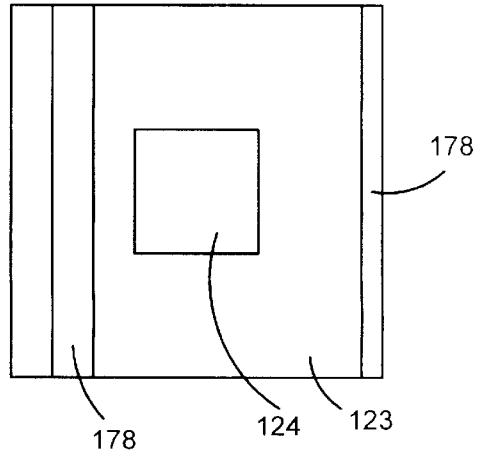

Of course, slits of other shapes could be used as well. For example, FIGS. 8C and 8D illustrate that slits 174 can be simply rectangular slits. In that case, pattern 178 is superimposed on viewing area 123. Then, with rotation of wheel 172, the pattern migrates across viewing area 123 as illustrated in FIG. 8B. This allows image detector 110 and controller 112 to provide position information which not only reflects movement of mouse 40 relative to surface 116, but which is also indicative of movement of wheel 172 (or the surface of wheel 172) relative to image detector 110 and light surface 104. This can all be done without traditional position encoders and associated circuitry and without hardware which is used in prior, conventional user input devices.

FIG. 9A is a block diagram illustration of a portion of a user input device (such as a mouse) 180. Mouse 180 is similar to mouse 170 shown in FIG. 7A, and similar items are similarly numbered. For the sake of clarity, wheel 172 has been moved from the position shown in FIG. 7A, and a number of the items shown in FIG. 7A have not been shown in FIG. 9A. Mouse 180 not only includes LED 104, but preferably includes two additional sources of electromagnetic radiation, such as LEDs 182 and 184. Further, mouse 180 includes a plurality of light pipes 186 and 188. Each of light pipes 186 and 188 may be formed of a single integral member, or of plurality of members coupled to one another to form the appropriate light path.

In operation, LED 104, lens 108 and image detector 110 operate in a similar fashion to that described above, with respect to an image located on surface 116. However, in accordance with another preferred embodiment, wheel 172 is provided with a plurality of darkened areas 192 spaced about the periphery thereof (as indicated in FIG. 9E). LED 182 is configured to emit radiation which impinges on an area proximate darkened regions 192 on wheel 172. As wheel 172 is rotated, the alternating darkened regions, and light regions 191 which reside between the darker regions 192, reflect the radiation emitted by LED 182. Light pipe 188 is configured to receive the radiation reflected by wheel 172 and direct that radiation onto a prespecified portion 194 of image detector 110. Since darkened portions 190 are separated by lighter portions 191, as wheel 170 is rotated, the intensity of reflected light, reflected from wheel 172 through light pipe 88, will change. Therefore, controller 112 (shown in FIG. 7A) is configured to examine the prespecified area 194 on image detector 110 to determine the intensity of the light impinging on that area in order to determine whether wheel 172 has rotated, or is being rotated.

Similarly, mouse 180 includes actuator button 196. Actuator button 196 is preferably a conventionally arranged press button which can be depressed by the user in order to perform an actuation operation. Thus, actuation button 196 is shown pivotally movable about pivot point 198 in the direction indicated by arrow 200. In one preferred embodiment, actuation button 196 includes a depending surface 202. LED 184 is configured to direct radiation emitted therefrom into light pipe 86, which directs that radiation to a second prespecified portion 204 of image detector 110.

As actuation button 196 is depressed, surface 202 moves downward to interrupt the emanation of radiation from LED 184 to light pipe 186. In one preferred embodiment, surface 202 is either opaque, or is formed of a filter material which filters a portion of the radiation emitted by LED 184. Thus, when actuator button 196 is depressed, the intensity of light emitted on prespecified portion 204 of image detector 110 decreases relative to the intensity which impinges on that region when actuator button 196 is not depressed.

Therefore, controller 112 is preferably arranged to intermittently examine prespecified portions 194 and 204 to determine whether wheel 172 is being rotated, and also to determine whether actuation button 196 is depressed.

It should be noted that, in some current operator input devices, wheel 172 can also operate as an actuation button, and can be depressible in much the same way as actuation button 196. Thus, a similar configuration can be provided to detect the depression (or actuation) of wheel 172. It should also be noted that, rather than providing darkened portions 190 on wheel 172, those portions could be transparent portions. Thus, the amount of light reflected from wheel 190 would decrease when LED 182 impinges upon one of the transparent areas.

Figure 9B:
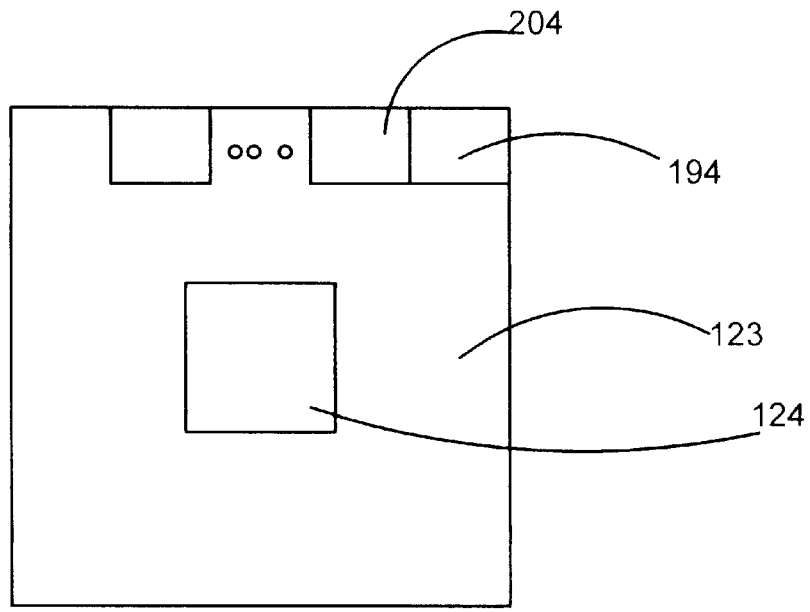

FIG. 9B illustrates a viewing area 123 and sample area 124. FIG. 9B also illustrates the prespecified areas 194 and 204 on viewing area 123 which are used to detect rotation of wheel 172 and actuation of button 196. Of course, it should be noted that any number of prespecified areas can be provided on viewing area 123, so long as there is also sufficient remaining area to detect movement of objects on surface 116.

Other methods could be used to detect movement relative to surface 116, rotation and depression of wheel 172 and depression of actuation button 196. For example, if a specified section of viewing area 123 is not available, then a histogram algorithm can be used to detect light added by rotation or depression of wheel 172, and by depression of actuator button 196. Light pipes 186 and 188 are then repositioned to direct the radiation conducted thereby such that it impinges upon the entire viewing area 123 of image detector 110. Thus, the overall intensity of the radiation impinging on viewing area 123 increases as the light reflected from wheel 172, and the light provided by LED 184, increases.

Figure 9C:
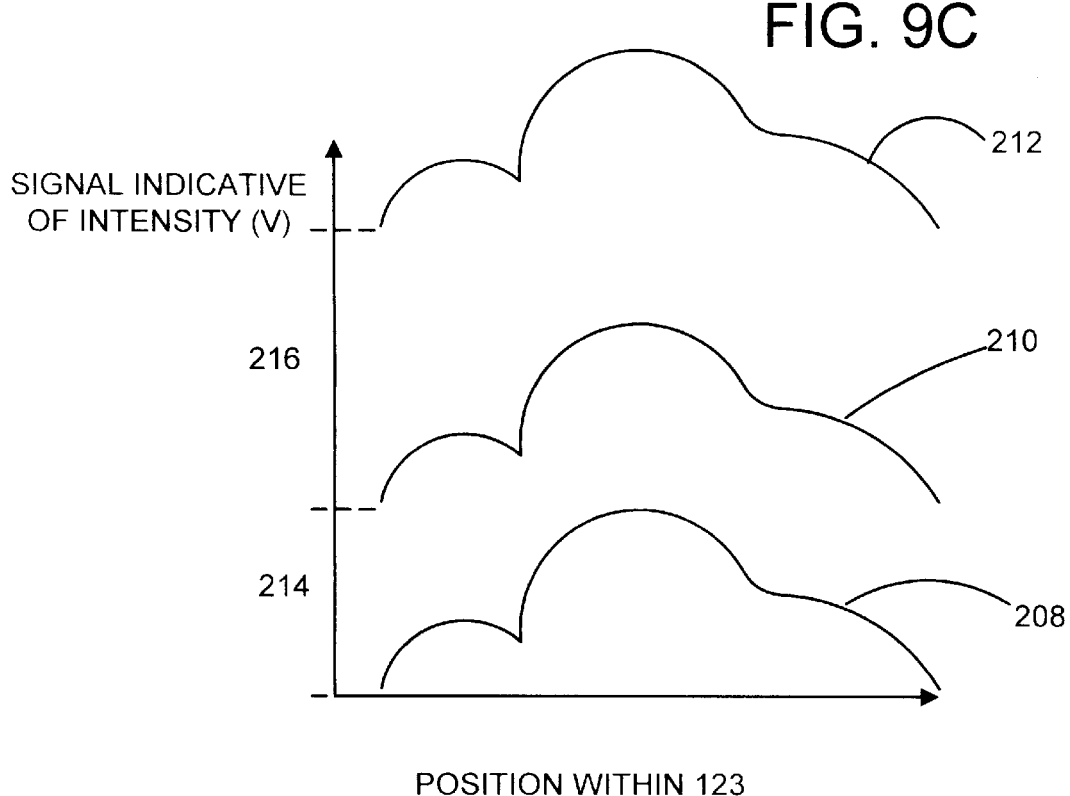

FIG. 9C illustrates a graph 206 which plots a signal indicative of intensity (such as voltage) against position on viewing area 123. FIG. 9C illustrates that, in the embodiment in which image detector 110 is an artificial retina, the output is an analog signal which varies over the viewing area. FIG. 9C illustrates three waveforms, 208, 210 and 212. Waveform 208 is a general depiction of an example of a waveform provided by image detector 110 which is indicative of the image on surface 116 within viewing area 123. Waveform 208 has a baseline intensity and varies with variation in the image along viewing area 123. The peaks and troughs in the signal correspond to different portions of the image on viewing area 123.

Waveform 210 illustrates the same waveform as waveform 208, but with wheel 172 rotated to a position which causes a larger amount of light to be reflected therefrom through light pipe 188 onto the entire viewing area 123. In that case, waveform 210 still represents the image detected on surface 116, by its shape. However, an offset 214 exists relative to waveform 208. Thus, controller 112 can be configured to detect offset 214 and interpret that to mean that wheel 172 has been rotated to a position in which more light is being reflected therefrom.

Similarly, waveform 212 illustrates the same waveform as waveforms 208 and 210, but which also includes an offset 216 from waveform 210. Waveform 212 corresponds to a waveform in which wheel 172 is at a position where it reflects a larger amount of light, and also where actuator button 196 is at a position such that it does not impinge upon the radiation emitted from LED 184 to light pipe 186. Since, in the embodiment currently being discussed, light pipe 186 is arranged to emit radiation over the whole viewing area 123, controller 212 can be configured to detect offset 216 and interpret that as meaning that actuation button 196 is in the undepressed position.

In one preferred embodiment, offsets 214 and 216 are of a different magnitude such that controller 112 can distinguish between the two offsets, and thus determine which event is being indicated by the given offset.

Figure 9D:
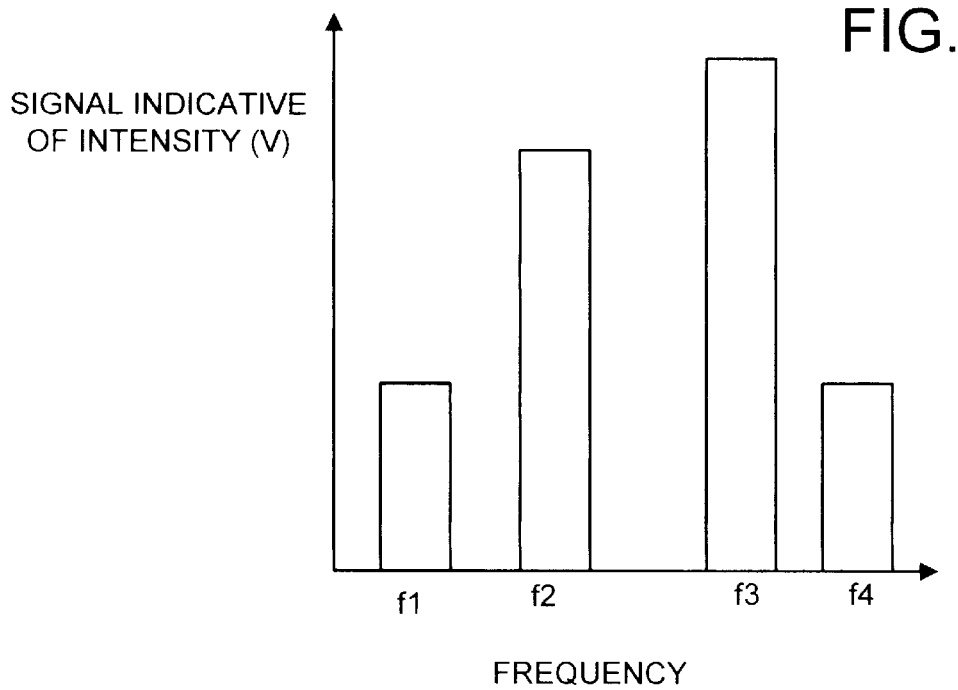

FIG. 9D illustrates yet another technique for detecting the various events which can take place in mouse 180. In the embodiment illustrated by FIG. 9D, LEDs 104, 182 and 184 preferably emit different wavelength radiation. Since an artificial retina image detector provides an analog output signal, the signal received at the output of the array can be filtered to isolate various frequency components of the signal. FIG. 9D illustrates a plot of a signal indicative of intensity (such as voltage) provided by image detector 110 plotted against frequency. If the output signal of image detector 110 is filtered and subjected to threshold detection, the levels of intensity at various radiation frequencies can be isolated to provide an indication of which event is then taking place in mouse 180. For example, FIG. 9D shows four frequencies, f1, f2, f3, and f4. Assuming that frequencies f1–f3 correspond to the frequencies of radiation emitted by LEDs 104, 182 and 184, controller 112 can determine, based upon the intensity of radiation received at those frequency levels, whether wheel 172 is being rotated or depressed, and whether actuation button 196 is being depressed.

In another embodiment, the LEDs 104, 182 and 184 can be activated in a cyclical fashion. This cycling is synchronized to the signal provided by image detector 110 and controller can determine which event is occurring, based on the intensity and the sampled time period.

Figure 10B:
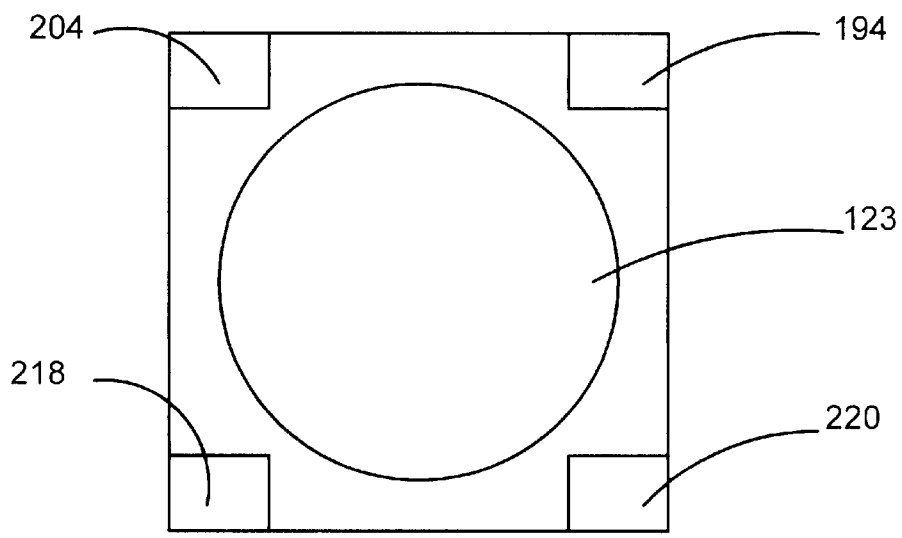
FIG. 10B illustrates detection of patterns using the device shown in FIG. 10A.
Figure 10A:
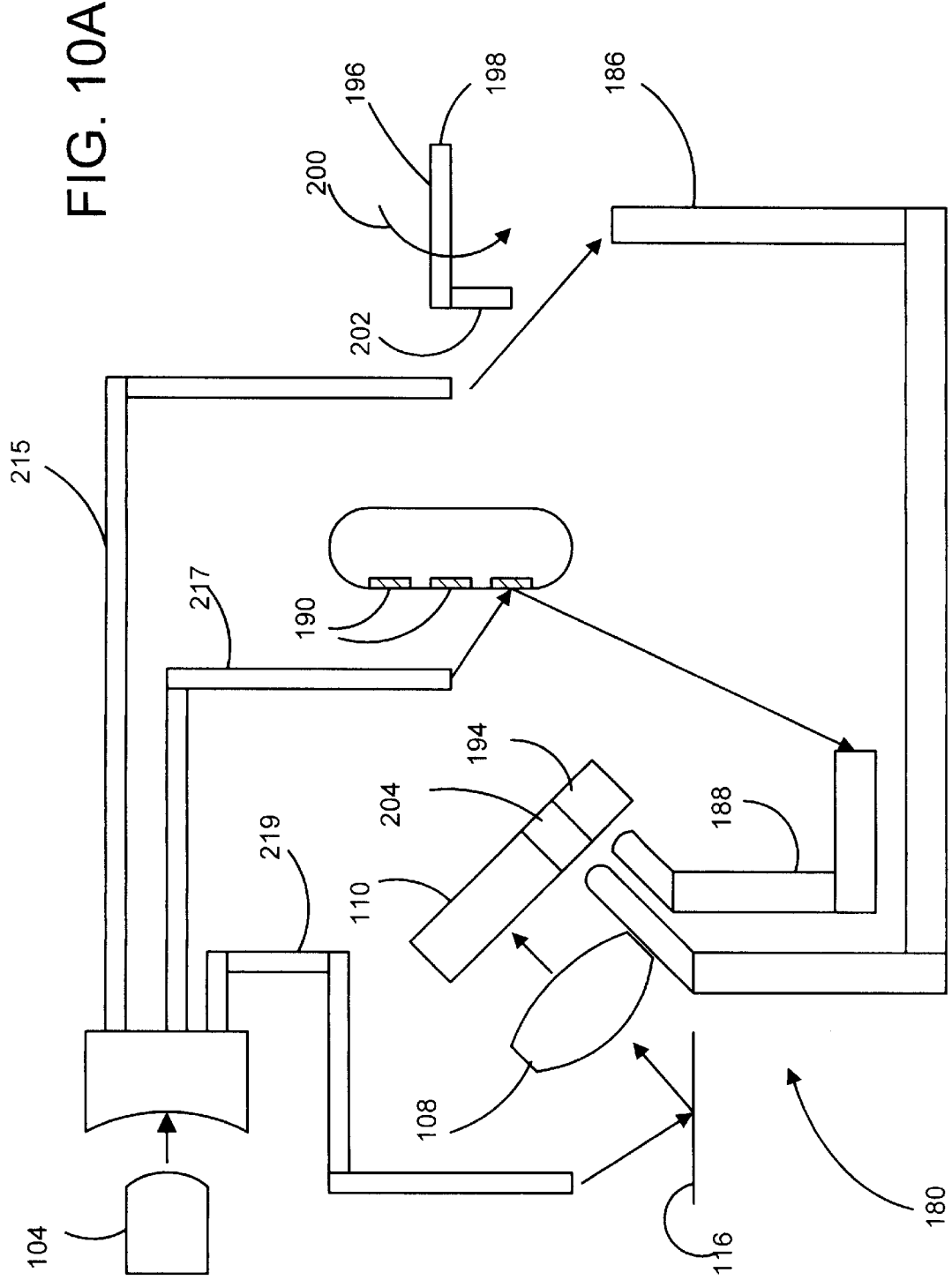
FIG. 10A is a block diagram of a portion of a user input device in accordance with another aspect of the present invention.

FIG. 10A illustrates mouse 180 with one modification from that shown in FIG. 9A. Rather than providing separate discrete LEDs 104, 182 and 184, mouse 180 shown in FIG. 10A provides only a single LED 104, with a plurality of light pipes 215, 217 and 219 directing a portion of the radiation emitted by LED 104 to the specific positions illustrated. Thus, the separate sources of electromagnetic radiation need not be provided.

FIG. 10B illustrates another method of detecting various events in mouse 180. FIG. 10B shows that prespecified portions 194, 204, 218 and 220 are not arranged along the top of viewing area 123, as illustrated by FIG. 9B, but are instead arranged in the corners of viewing area 123. This can be accomplished, in one preferred embodiment, by providing light pipes 186 and 188 (in FIG. 9A) or light pipes 215, 217, and 219 (in FIG. 10A) and any other desired number of light pipes, and arranging those light pipes such that light emitted thereby is directed onto the prespecified areas 194, 204, 218 and 220.

FIG. 11A illustrates another embodiment of an input device 224 in accordance with another aspect of the present invention. A number of items of input device 224 are similar to those shown in FIG. 7A, and are similarly numbered. However, for the sake of clarity, current driver 114 and controller 112 have been eliminated from FIG. 11A. Elements are also slightly rearranged in FIG. 11A relative to those shown in FIG. 7A, again for the sake of clarity. For example, LED 104 is still arranged to impinge radiation on surface 116. However, lens 108 and image detector 110 are arranged such that the radiation reflected from surface 116 is reflected upwardly to engage mirror element 226. Mirror element 226 redirects the radiation back down onto lens 108 where it is collected and transmitted to image detector 110. Input device 224 also includes a second LED 228 and a track ball 230. Track ball 230 is preferably mounted to housing 102 in a conventional manner such that it is rotatable relative to housing 102 in all directions.

LED 228 is arranged to emit radiation which impinges on the surface of track ball 230. The light reflected from the surface of track ball 230 is reflected onto lens 108. Controller 112 (not shown in FIG. 11A) is preferably configured to switch between actuation of LED 104 and LED 228, either as desired by the user or in a cyclical fashion mentioned above.

It can thus be seen that, when LED 104 is actuated, user input device 224 can be used as a conventional mouse and moved relative to surface 116. Controller 112 then provides position information which is indicative of the movement of mouse 224 relative to surface 116. However, when LED 228 is activated, user input device 224 can be used much the same as a conventional track ball input device. The user simply rotates track ball 230 and images on the surface of track ball 230 are detected by image detector 110. Since the device image detector is surface independent, the mouse ball does not need any specific patterns to be imprinted on the mouseball surface. Controller 110 thus provides position information which is indicative of the rotation of track ball 230.

It should also be noted that, in a preferred embodiment, an optional opaque separator element 232 can be placed to separate the radiation which impinges on lens 108 and image detector 110. In that embodiment, image detector 110 is separated into two image detector areas 234 and 236, as indicated in FIG. 11B. Thus, both LEDs 104 and 228 can be actuated at the same time, and controller 112 can provide combined or separated position information indicative not only of the movement of user input device 224 relative to surface 116, but also indicative of the user's movement of track ball 230. This turns user input device 224 into a four-degree of freedom device.

Figure 12A:
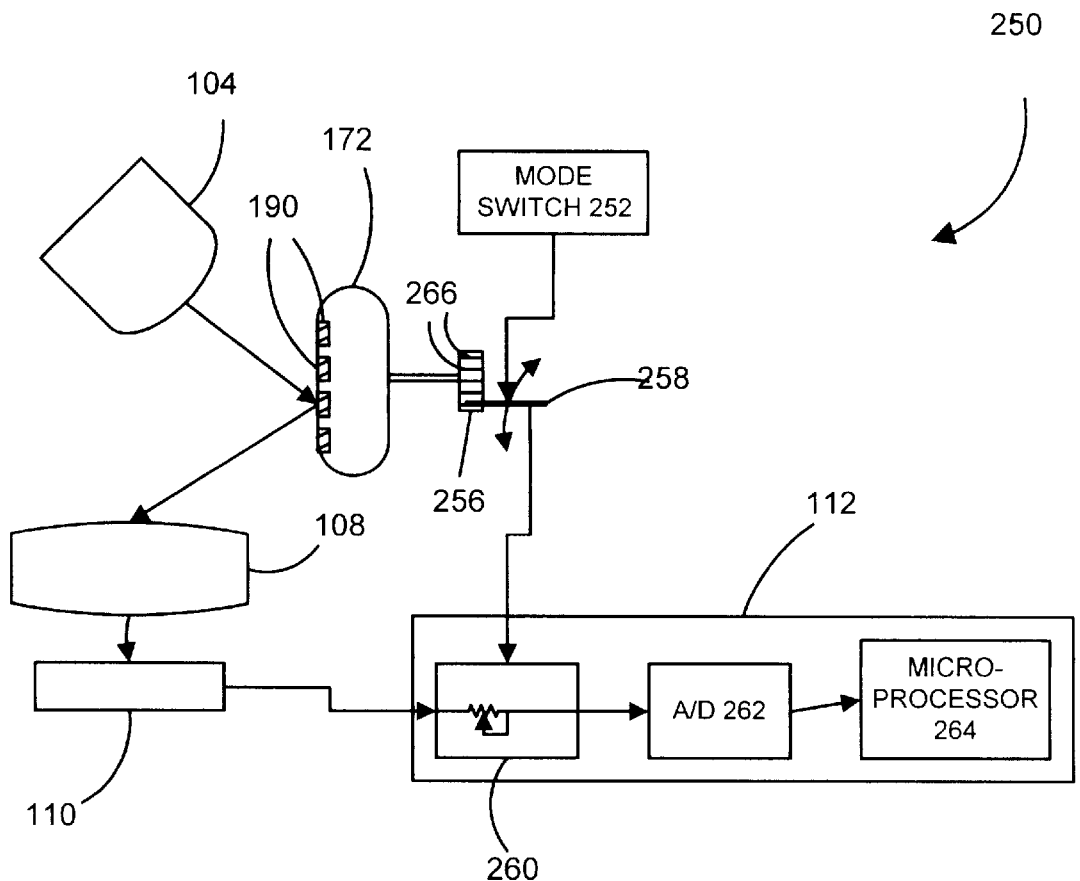
FIG. 12A is a block diagram of a portion of a user input device in accordance with another aspect of the present invention.

FIG. 12A is a block diagram of a portion of a user input device 250 in accordance with another aspect of the present invention. A number of items shown in FIG. 12A are similar to those shown in previous figures, and are similarly numbered. However, FIG. 12A illustrates that user input device 250 includes mode switch 252, shaft 254 coupled to wheel 172, detent wheel 256 and detent blocker 258. FIG. 12A also illustrates that controller 112, in one preferred embodiment, includes variable resistor 260, analog-to-digital (A/D) converter 262 and microprocessor 264.

In one preferred embodiment, detent wheel 256 is fixedly coupled to wheel 172 by shaft 254. Detent wheel 256 also preferably includes a plurality of detents 266 on its outer periphery. Thus, as wheel 172 rotates, detent wheel 256 is also driven through rotation by shaft 254.

Detent blocker 258, in one preferred embodiment, is a resilient element which engages detents 266 on detent wheel 256. Therefore, as the user rotates wheel 172, detents 266 rotate causing corresponding deflection of detent blocker 258. The resilience of detent blocker 258 provides the user with a tactile feedback corresponding to rotation of wheel 172.

Also, in one preferred embodiment, it may desirable to allow wheel 172 to act as a free wheel, without tactile detent feedback. Thus, device 250 is provided with mode switch 252. User actuation of mode switch 252 causes detent blocker 258 to be retracted out of engagement with detents 266 on detent wheel 256. This can be accomplished using any suitable mechanism or other configuration. In that configuration, wheel 172 can be freely rotated by the user, as a free wheel, without any tactile feedback.

It should also be noted that the same free wheel configuration can be obtained using a clutch mechanism (not shown). In such a clutch mechanism, a first clutch surface (or clutch wheel) is be rigidly attached to wheel 172 and has a detent wheel engaging surface facing detent wheel 256. Detent wheel 256 is preferably movable toward, and away from, the clutch wheel. In order to engage the clutch, detent wheel 256 is moved toward the clutch wheel such that a mating surface or detent wheel 256 comes into engagement with the clutch wheel thereby causing detent wheel 256 to rotate with wheel 172. To disengage the clutch, of course, detent wheel 256 is moved out of engagement with the clutch wheel and therefore does not turn with wheel 172, allowing wheel 172 to turn as a free wheel.

FIG. 12A also illustrates controller 112 in greater detail. The analog output of image detector 110, in one preferred embodiment, is fed into variable resistor 260. The output of variable 260 is, in turn, provided to A/D converter 262, A/D converter 262 provides a digital output which is indicative of the input received from variable resistor (or force sensitive resistor) 260. Microprocessor 264 receives the digital output for further processing.

Figure 12B:
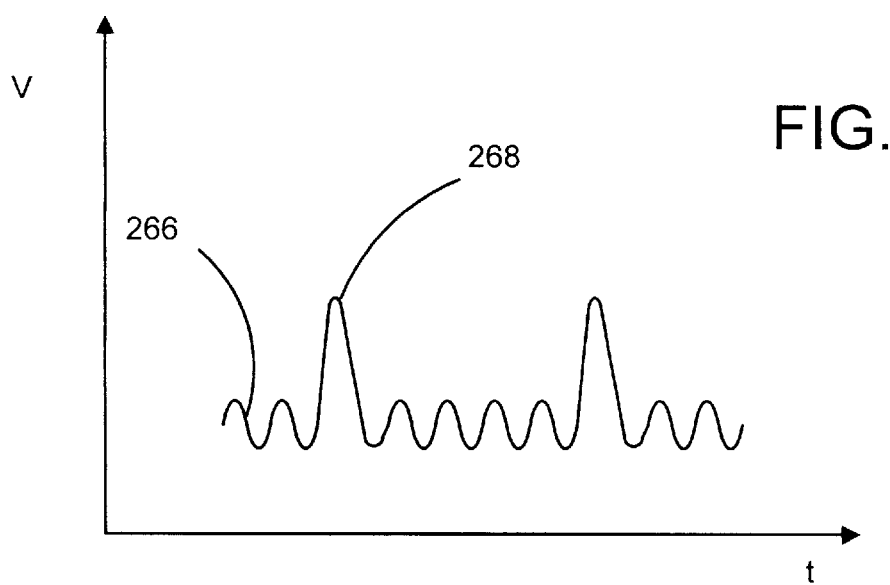
FIG. 12B illustrates a waveform generated by a portion of the user input device shown in FIG. 12A.

FIG. 12B illustrates a waveform 266 indicative of an input to A/D converter 262. During normal operation, the analog output signal from image detector 110 varies based upon the intensity of light impinging thereon. If, in the example illustrated, wheel 172 is continuously rotated such that darkened regions 190 on wheel 172 are continuously passing through the radiation emitted by LED 104, the output from image detector 110, in one preferred embodiment is a continuously varying analog signal, such as a sinewave signal indicated by sine wave 266. The amplitude of the signal is reduced after passing through variable resistor 260 and is provided to A/D converter 262.

In the configuration illustrated in FIG. 12A, deflection of detent blocker 268 under the force of detents 266 causes variable resistor 260 to change values. This results in the magnitude of the signal 262 to also vary, in a corresponding manner. In one preferred embodiment, defection of detent blocker 258 under the force of one of detents 266 causes the magnitude of the signal provided to A/D converter 262. In FIG. 12B, this corresponds to a higher magnitude signal 268 reaching A/D converter 262 with each deflection of detent blocker 258. Thus, the output of A/D converter 262 includes a digital value which varies as the magnitude of waveform 266 varies. Microprocessor 264 can then detect the number of detents or notches through which wheel 172 is rotated. This allows microprocessor 264 to obtain rate information, as well the detent information, from the signal.

It should be noted that the present invention can also be used with other user input configurations, such as joysticks. The present invention operates without a predetermined pattern on the surface and without expensive charge coupled devices. It should also be noted that the overall viewing area is preferably approximately 10 mm×10 mm. Any suitable area can be used. However, it has been found that an appropriate lens for focusing on a much smaller area is more expensive. It should be further noted that the solid state artificial retina image detector 110 can be combined on the same die as controller 112.

Thus, the present invention provides a user input device which is capable of detecting movement of the user input device relative to one or more surfaces (when the surface is a work surface such as surface 116, or a surface of a movable apparatus mounted on the user input device such as a wheel or a track ball or an actuator button). The surface need have no predetermined pattern thereon. This is done through detection of images or patterns, and monitoring of movement of the detected images or patterns on the surface relative to the user input device. Thus, this is done without conventional position encoders and without expensive charge coupled devices. Further, the present invention provides a number of different algorithms for detecting movement of the identified pattern, provides feedback to adjust the intensity of the source of electromagnetic radiation, and also provides power saving techniques to reduce power consumed by the user input device.

Although the present invention has been described with reference to preferred embodiments, workers skilled in the art will recognize that changes may be made in form and detail without departing from the spirit and scope of the invention.

What is claimed is:

1. An operator input device configured to provide position information based on relative movement of a surface and the operator input device, the position information being provided to control movement of a visual image on a visual display screen of a computing device, the operator input device comprising:

a housing;

a pattern independent image detector coupled to the housing and having a predetermined sample area positioned within an image detector viewing area, the image detector being configured to detect within the predetermined sample area an image of a first pattern on the surface and provide a pattern signal corresponding to the image of the first pattern detected; and a controller coupled to the pattern detector and configured to receive the pattern signal and provide the position information based on a first position of the image of the first pattern within the predetermined sample area.

2. The operator input device of claim 1 wherein after detection of the image of the first pattern within the predetermined sample area, the controller is configured to determine a second position of the image of the first pattern in the image detector viewing area around the predetermined sample area and to provide the position information based on movement of the image of the first pattern from the first position in the predetermined sample area to the second position in the image detector viewing area around the predetermined sample area.

3. The operator input device of claim 2 wherein the controller is configured to detect within the predetermined sample area an image of a second pattern, after movement of the image of the first pattern, and to provide the position information based on movement of the image of the second pattern from the predetermined sample area into the image detector viewing area surrounding the image detector viewing area.

4. The operator input device of claim 1 wherein the housing includes an aperture and wherein the image detector is arranged to detect the image of the first pattern on a work surface, through the aperture.

5. The operator input device of claim 1 and further comprising:

a movable element mounted to the housing and wherein the surface is disposed on the movable element.

6. The operator input device of claim 5 wherein the movable element comprises:

a track ball rotatably mounted to the housing.

7. The operator input device of claim 5 wherein the movable element includes a rotatable wheel mounted for rotation relative to the housing.

8. The operator input device of claim 5 wherein the movable element comprises an actuator button movably mounted to the housing.

9. The operator input device of claim 5 wherein the housing includes an aperture and wherein the image detector is configured to detect the image of the first pattern on a work surface, through the aperture, and to detect an image of a second pattern on the surface of the movable element.

10. The operator input device of claim 1 wherein the pattern detector comprises:

a source of electromagnetic radiation.

11. The operator input device of claim 10 wherein the pattern detector comprises:

an image sensor array arranged to receive radiation carrying pattern information about the surface.

12. The operator input device of claim 11 wherein the pattern detector comprises:

an artificial retina arranged to receive radiation carrying pattern information about the surface.

13. The operator input device of claim 10 and further comprising:

a driver, coupled to the source of electromagnetic radiation, providing a driving signal to drive the source of electromagnetic radiation; and wherein the controller is coupled to the driver and is configured to detect intensity of the source of electromagnetic radiation and provide a feedback signal to the driver based on the intensity detected to adjust the intensity.

14. The operator input device of claim 13 wherein the controller is configured to determine whether the intensity detected is within a desired range and adjust the feedback signal to the driver based on the determination.

15. The operator input device of claim 10 wherein the controller is coupled to the source of electromagnetic radiation and is configured to only intermittently actuate the source of electromagnetic radiation.

16. The operator input device of claim 10 wherein the source of electromagnetic radiation is configured to radiate electromagnetic radiation in an elongate pattern.

17. The operator input device of claim 10 wherein the source of electromagnetic radiation includes a plurality of point light sources.

18. The operator input device of claim 9 wherein the pattern detector further includes:

a plurality of light pipes directing electromagnetic energy from the source to a plurality of surfaces; and a detection device; and a second plurality of light pipes, the second plurality of light pipes directing electromagnetic energy reflected from the plurality of surfaces to the detection device.

19. A method of providing information for controlling movement of a visual image on a display screen of a computing device, the method comprising:

providing an operator input element movable relative to a surface;

detecting an image, in a predetermined sample area of an image sensor, of a first pattern on the surface;

detecting relative movement of the operator input element and the pattern on the surface by detecting movement of the image of the first pattern into an image detector viewing area surrounding the predetermined sample area; and providing position information indicative of the relative movement detected.

20. The method of claim 19 wherein detecting relative movement comprises:

detecting a first position of the image of the first pattern within the predetermined sample area; and detecting movement of the image of the first pattern from the first position.

21. The method of claim 20 wherein detecting movement of the image of the first pattern from the first position comprises:

detecting a distance of movement of the image of the first pattern from the first position.

22. The method of claim 20 wherein detecting movement of the image of the first pattern from the first position comprises:

detecting a speed of movement of the image of the first pattern from the first position.

23. The method of claim 19 wherein detecting the image of the first pattern on the surface comprises:

impinging electromagnetic radiation on the surface; and detecting electromagnetic radiation carrying information indicative of the first pattern on the surface.

24. The method of claim 23 and further comprising:

extracting the image of the first pattern from the electromagnetic radiation detected.

25. The method of claim 24 and further comprising:

intermittently detecting an intensity of the electromagnetic radiation; and adjusting the intensity detected based on a desired intensity range.

26. The method of claim 24 wherein extracting the image of the first pattern comprises:

detecting rotational movement of the first pattern.

27. The method of claim 26 wherein impinging electromagnetic radiation comprises:

impinging the electromagnetic radiation in an elongate pattern.

28. The method of claim 26 wherein impinging electromagnetic radiation comprises:

impinging the electromagnetic radiation with a plurality of separated radiation sources.

29. An operator input device configured to provide position information based on relative movement of a surface and the operator input device, the position information being provided to control movement of a visual image on a visual display screen of a computing device, the operator input device comprising:

a housing including an aperture;

a movable element mounted to the housing, wherein a first surface is disposed on the movable element;

a pattern independent image detector coupled to the housing and being configured to detect a first pattern on a work surface through the aperture and to detect a second pattern on the first surface disposed on the moveable element, the pattern independent image sensor providing pattern signals corresponding to the first and second detected patterns; and a controller coupled to the pattern detector and configured to receive the pattern signals and to provide the position information based upon the pattern signals.

30. The operator input device of claim 29 wherein the pattern detector further includes:

a plurality of light pipes directing electromagnetic energy from the source to a plurality of surfaces;

a detection device; and a second plurality of light pipes, the second plurality of light pipes directing electromagnetic energy reflected from the plurality of surfaces to the detection device.

31. An operator input device configured to provide position information based on relative movement of a surface and the operator input device, the position information being provided to control movement of a visual image on a visual display screen of a computing device, the operator input device comprising:

a housing;

a pattern independent image detector coupled to the housing and being configured to detect a first pattern on the surface and provide a pattern signal corresponding to the first pattern detected, wherein the pattern detector further comprises:

a source of electromagnetic radiation; and a driver, coupled to the source of electromagnetic radiation, providing a driving signal to drive the source of electromagnetic radiation; and a controller coupled to the pattern detector and configured to receive the pattern signal and provide the position information based on a position of the first pattern relative to the pattern detector, wherein the controller is also coupled to the driver and is also configured to detect intensity of the source of electromagnetic radiation and provide a feedback signal to the driver based on the intensity detected to adjust the intensity.

32. The operator input device of claim 31, wherein the controller is configured to determine whether the intensity detected is within a desired range and adjust the feedback signal to the driver based on the determination.

33. An operator input device configured to provide position information based on relative movement of a surface and the operator input device, the position information being provided to control movement of a visual image on a visual display screen of a computing device, the operator input device comprising:

a housing;

a rotatable wheel mounted to the housing, wherein the surface is disposed on the rotatable wheel;

a pattern independent image detector coupled to the housing and being configured to detect a first pattern on the surface and provide a pattern signal corresponding to the first pattern detected; and a controller coupled to the pattern detector and configured to receive the pattern signal and provide the position information based on a position of the first pattern relative to the pattern detector, wherein the controller is configured to detect a second pattern and a position of the second pattern relative to the pattern detector, after movement of the first pattern, and to provide the position information based on movement of the second pattern from the position.

34. An operator input device configured to provide position information based on relative movement of a surface and the operator input device, the position information being provided to control movement of a visual image on a visual display screen of a computing device, the operator input device comprising:

a housing;

an actuator button movably mounted to the housing, wherein the surface is disposed on the actuator button;

a pattern independent image detector coupled to the housing and being configured to detect a first pattern on the surface and provide a pattern signal corresponding to the first pattern detected; and a controller coupled to the pattern detector and configured to receive the pattern signal and provide the position information based on a position of the first pattern relative to the pattern detector, wherein the controller is configured to detect a second pattern and a position of the second pattern relative to the pattern detector, after movement of the first pattern, and to provide the position information based on movement of the second pattern from the position.

35. An operator input device configured to provide position information based on relative movement of a surface and the operator input device, the position information being provided to control movement of a visual image on a visual display screen of a computing device, the operator input device comprising:

a housing;

a pattern independent image detector coupled to the housing and being configured to detect a first pattern on the surface and provide a pattern signal corresponding to the first pattern detected, the pattern detector including a source of electromagnetic radiation configured to radiate electromagnetic radiation in an elongate pattern onto the surface; and a controller coupled to the pattern detector and configured to receive the pattern signal and provide the position information based on a position of the first pattern relative to the pattern detector.

36. An operator input device configured to provide position information based on relative movement of a surface and the operator input device, the position information being provided to control movement of a visual image on a visual display screen of a computing device, the operator input device comprising:

a housing;

a pattern independent image detector coupled to the housing and being configured to detect a first pattern on the surface and provide a pattern signal corresponding to the first pattern detected, the pattern detector including a plurality of point light sources configured to radiate maximum electromagnetic radiation to spaced apart points on the surface; and a controller coupled to the pattern detector and configured to receive the pattern signal and provide the position information based on a position of the first pattern relative to the pattern detector.

37. A method of providing information for controlling movement of a visual image on a display screen of a computing device, the method comprising:

providing an operator input element movable relative to a surface;

detecting a pattern on the surface, wherein detecting a pattern on the surface comprises:

impinging electromagnetic radiation on the surface by radiating the electromagnetic radiation in an elongate pattern;

detecting electromagnetic radiation carrying information indicative of the pattern on the surface; and detecting rotational movement of the pattern by extracting the pattern from the electromagnetic radiation detected;

detecting relative movement of the operator input element and the pattern on the surface; and providing position information indicative of the relative movement detected.

* * * * *

UNITED STATES PATENT AND TRADEMARK OFFICE
CERTIFICATE OF CORRECTION

PATENT NO. : 6,172,354 B1
DATED : January 9, 2001
INVENTOR(S) : Manolito E. Adan et al.

It is certified that error appears in the above-identified patent and that said Letters Patent is hereby corrected as shown below:

Title page,
Item [56], OTHER PUBLICATIONS,
"Genius Optical Mouse", brochure, delete "1988" and insert -- 1998 --.

Column 3,
Line 40, after "(ROM) 24", delete "a" and insert -- and --.

Column 4,
Line 26, after "local", delete "are" and insert -- area --.

Column 7,
Line 62, after "mouse", delete "42" and insert -- 40 --.
After line 12, equation 1, please replace Equation 1 with the following:

$$R(x,y) = \int_{-\frac{L_P}{2}}^{+\frac{L_P}{2}} \int_{-\frac{L_P}{2}}^{+\frac{L_P}{2}} P(i,j) Q(i-x, j-y) \, di \, dj$$

Column 9,
Line 43, before "e.g., elliptical)" insert -- ( --.

Column 10,
Line 23, before "174", delete "notches" and insert -- slits -- .
Line 35, after "mouse", delete "40" and insert -- 170 --.

Column 11,
Line 1, after "wheel", delete "170" and insert -- 172 --.
Line 3, after "pipe", delete "88" and insert -- 188 --.
Line 17, after "pipe", delete "86" and insert -- 186 --.
Line 41, after "wheel", delete "190" and insert -- 172 --.

Column 12,
Line 30, after "controller", delete "212" and insert -- 112 --.
Line 62, after "controller", insert -- 112 --.

Column 14,
Line 15, after "is", delete "be".

UNITED STATES PATENT AND TRADEMARK OFFICE
CERTIFICATE OF CORRECTION

PATENT NO.    : 6,172,354 B1
DATED         : January 9, 2001
INVENTOR(S)   : Manolito E. Adan et al.

It is certified that error appears in the above-identified patent and that said Letters Patent is hereby corrected as shown below:

<u>Column 15,</u>
Line 2, after "signal", insert -- provided from variable resistor 260 to A/D converter --.
Line 3, delete "defection" and insert -- deflection --.
Line 4, after "the" second occurrence, insert -- resistance of variable resistor 260 to be reduced. This results in a corresponding increase in the --.
Line 10, after "detect", insert -- not only the direction and rate at which wheel 172 is being rotated, but it can also detect --.

<u>Column 16,</u>
Line 17, after "input", delete "de vice" and insert -- device --.

Signed and Sealed this

Ninth Day of July, 2002

*Attest:*

*Attesting Officer*

JAMES E. ROGAN
*Director of the United States Patent and Trademark Office*